United States Patent Office 2,959,512
Patented Nov. 8, 1960

2,959,512

LAMINATED PAPERBOARD PRODUCTS AND METHOD OF MAKING SAME

William H. Roberson, Wilmington, Del., assignor to Hercules Powder Company, Wilmington, Del., a corporation of Delaware No Drawing. Filed Mar. 15, 1956, Ser. No. 580,424

4 Claims. (Cl. 154—138)

This invention relates to laminated paperboard made with alkaline laminating adhesives and to methods of preparing same. In a more specific aspect, this invention relates to sodium silicate-laminated paperboard and to methods of preparing same.

Alkaline laminating adhesives are frequently used in the manufacture of laminated paperboard. Sodium silicate is particularly useful for this purpose because it is cheap, gels very quickly, thereby permitting high speed laminating operation and imparts rigidity to the laminated paperboard. However, when this type of adhesive is used in the preparation of laminates from rosin-sized paper, there is the very definite disadvantage that the water resistance of the paper is destroyed or, at least, substantially diminished. As a result the laminate obtained has little or no water resistance. It has been necessary, therefore, to use more expensive adhesives and more fiber in the preparation of such laminates in order that fiber drums and similar articles prepared therefrom have the rigidity and high degree of water resistance required for such articles.

A principal object of the present invention is the preparation of alkaline adhesive-laminated paperboard which will overcome the disadvantages of prior laminated paperboard of this type made with rosin size and sodium silicate or other alkaline adhesive.

It has now been found that alkaline adhesive-laminated paperboard of increased water resistance can be prepared if the paper is treated with from about 0.05% to about 1% by weight of an alkylketene dimer, based on the dry weight of the fibers prior to the application of the alkaline adhesive and formation into laminates. The alkylketene dimer may be incorporated with the cellulosic fibers before or after sheet formation and in any desired manner such as by beater addition, size press, spray application, press rolls and so on. The ketene dimer may be utilized in liquid form if a liquid, in molten form if a solid, in solvent solution with a suitable solvent, or in aqueous emulsions.

After application, for example, to a sheet of cellulosic fibers, the sheet may be cured by heating to a relatively elevated temperature, say about 100° C., for a short period of time, such as about 10 minutes. Altrenatively, curing may be effected by permitting the sheet to stand at room temperature for a few hours. The sheets containing the alkylketene dimer are then sprayed with, immersed in, or otherwise subjected to treatment with the alkaline adhesive and formed into laminates in the usual or any well-known manner. The laminates so produced have substantially improved water resistance which makes them especially suitable for the preparation of water-resistant fiber shipping drums and the like.

Having described the invention generally, the following examples are given to illustrate specific embodiments thereof. In the examples the water resistance of sodium silicate-laminated paperboards containing rosin size and alum are compared with sodium silicate-laminated paperboards containing an alkylketene dimer. The former were prepared from regular rosin-sized liner board which in turn was prepared as follows: A dilute emulsion of rosin size was added to an aqueous suspension of unbleached kraft pulp. The resulting mixture had a pH of about 8. Sufficient alum was then added to lower the pH of the system to about 5.5. Finally, the sized pulp slurry was diluted to about 0.5% consistency. The linerboard was formed from this dilute slurry in the usual manner. The latter, namely, the sodium silicate-laminated paperboards, were prepared by treating unsized unbleached kraft liner board having a weight of 45 lbs./100 sq. ft. at the size press with an aqueous emulsion of alkylketene dimers having a concentration such as to deposit 5.7 lbs. of alkylketene dimer per ton of board. The aqueous emulsion of alkylketene dimer was prepared by stirring Aquapel 380, a product sold by the Hercules Powder Company, and composed of alkylketene dimers containing, in admixture, a water-dispersible emulsifying agent, into a 4.5% starch solution at a temperature between 130 and 150° F. to form an emulsion having an Aquapel concentration of 0.77%.

Example 1

5-ply laminates of regular rosin-sized liner board and alkyl ketene dimer-sized liner board, made as described above, were prepared as follows:

Two 6 x 2-inch strips from each sample were soaked in sodium silicate (40° Baumé) at 50–55° C. for one minute. A 5-layer sandwich was then made from the two soaked strips and three unsoaked strips and pressed between squeeze rolls. The pickup of silicate solution was 45% for the regular rosin-sized liner board and 49% for the alkylketene dimer-sized liner board. These laminates were then dried in an oven at 105° C. for 45 minutes following which they were tested for water resistance by soaking in water. The laminate prepared from the alkylketene dimer-sized board picked up 15% water after ten minutes soaking, and 29% water after 45 minutes soaking. The laminate from the rosin-sized board picked up 102% water after 10 minutes soaking, and 128% water after 45 minutes soaking. It is quite apparent, therefore, that the water resistance of the alkylketene dimer-sized laminate was considerably greater than that of the laminate of regular rosin-sized liner board.

Example 2

5-ply 5 x 6-inch sodium silicate laminates were formed from both the rosin-sized liner board and the alkylketene dimer-sized liner board, prepared as above indicated. Sodium silicate (40° Baumé) was applied at 50–55° C. to the second and fourth plies by spreading with a drawknife. The silicate solution pickups were 36% and 26% for the rosin-sized and the alkylketene dimer-sized boards, respectively. These sandwiches were rolled with a rubber roller and then dried in an oven at 105° C. The water pickup of a portion of these laminates after 10 minutes was 117% for the rosin-sized boards and 54% for the dimer-sized boards.

Example 3

Fiber shipping containers were made from samples of the dimer-sized liner board and the regular rosin-sized liner board, prepared as described above, by winding them, after treatment with sodium silicate, on a mandrel to build up drums with 10-ply walls. The silicate pickup for the ketene dimer-treated board was 18.2 lbs./1000 sq. ft. and that for the regular rosin-sized board was 18.3 lbs./1000 sq. ft. These sample drums were shower tested by exposure for 24 hours to a heavy fog. The drum made from rosin-sized board delaminated completely, contained a puddle of water and the drum compression was reduced from 5060 to 188 pounds. The drum made from alkylketene dimer-sized board delaminated at the outer ply but was completely dry on the inside and drum compression was reduced only from 4650 to 2150 pounds.

Additional samples were exposed to 90% relative humidity for five days. A segment of the drum prepared from regular rosin-sized board absorbed water then just about as rapidly as a piece of blotting paper and after overnight soaking was redispersed pulp. On the other hand, a segment from the dimer-sized drum was nearly as repellent as before the humidity treatment and after overnight soaking returned appreciable rigidity even though it could be delaminated.

The ketene dimers which may be used in the process of the present invention are dimers having the formula $[RCH=C=O]_2$ where R is a hydrocarbon radical, such as alkyl having at least 8 carbon atoms, cycloalkyl having at least 6 carbon atoms, aryl, aralkyl, and alkaryl. In naming ketene dimers, the radical "R" is named followed by "ketene dimer." Thus, phenyl ketene dimer is:

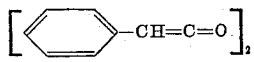

benzyl ketene dimer is:

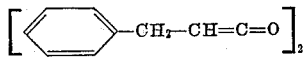

and decyl ketene dimer is: $[C_{10}H_{21}-CH=C=O]_2$. Representative ketene dimers whose emulsions may be used in the process of the instant invention include, octyl, decyl, dodecyl, tetradecyl, hexadecyl, octadecyl, eicosyl, docosyl, tetracosyl, phenyl, benzyl, β-naphthyl and cyclohexyl ketene dimers, as well as the ketene dimers prepared from montanic acid, naphthetic acid, $\Delta^{9,10}$-decylenic acid, $\Delta^{9,10}$-dodecylenic acid, palmitoleic acid, oleic acid, ricinoleic acid, petroselinic acid, vaccenic acid, linoleic acid, linolenic acid, eleostearic acid, licanic acid, parinaric acid, tariric acid, gadoleic acid, arachidonic acid, cetoleic acid, erucic acid, and selacholeic acid, as well as ketene dimers prepared from naturally occurring mixtures of fatty acids, such as those mixtures found in coconut oil, babassu oil, palm kernel oil, palm oil, olive oil, peanut oil, rape oil, beef tallow, lard (leaf) and whale blubber. Mixtures of any of the above-named fatty acids with each other may also be used.

As previously indicated herein, the ketene dimer may be utilized in liquid or molten condition, in solvent solution, or in aqueous emulsions such as described, for example, in U.S. Patent No. 2,627,477 to William Downey. While any of the emulsions of this patent may be used, those emulsions which are prepared using a nonionic emulsifier are particularly preferred. In addition to those nonionic emulsifiers specifically used by Downey, those nonionic emulsifiers which have been found to be particularly useful include polyoxyethylene sorbitan trioleate, sold by the Atlas Powder Company under the trade name "Tween 85"; polyoxyethylene sorbitol hexaoleate, sold by the Atlas Powder Company under the trade name "Atlox 1096"; polyoxyethylene sorbitol laurate, sold by the Atlas Powder Company under the trade name "Atlox 1045"; and polyoxyethylene sorbitol oleate-laurate, sold by the Atlas Powder Company under the trade name "Atlox 1045A."

Also, as previously indicated herein, the ketene dimer may be applied to the paper in any suitable manner either before or after web formation. Thus, the ketene dimer, preferably in aqueous emulsion, may be added to the pulp in the beater, following which the pulp is formed into a sheet and dried. The sheet may then be cured by heating at elevated temperatures, say about 100° C., for a short period of time such as about 10 minutes or alternatively permitted to stand at room temperature for a few hours. The ketene dimer may also be applied to the paper by tub sizing, spraying or by various coating techniques.

The amount of ketene dimer required to impart a desired degree of water resistance to the laminate will depend on a number of factors, such as the particular ketene dimer or mixture of ketene dimers used, the particular method of application, and the specific characteristics of the paper. In general, the paper should have applied thereto, or incorporated therewith, from about 0.05% to about 1% of the alkylketene dimer based on the weight of the paper. Within this broad range, it is preferred to incorporate from about 0.1% to about 0.5% alkylketene dimer based on the weight of the paper.

The paper containing the alkylketene dimer is then treated with sodium silicate or other alkaline laminating adhesive such as casein and formed into laminates in the usual or any well-known manner. For example, in accordance with one procedure for making a laminated paperboard drum, an aqueous solution of sodium silicate (18%) is applied to strips of linerboard so that a pickup of about 18 pounds of solution per 1,000 sq. ft. of board is obtained. These strips are then wound while wet upon a mandrel forming a drum of the desired thickness. The drums are then allowed to air dry.

The term "paperboard" as used herein refers to sheeted paper products manufactured in the usual, or any well-known manner, from cellulose fibers.

What I claim and desire to protect by Letters Patent is:

1. The process of preparing laminated paperboard having improved water resistance which comprises forming an aqueous suspension of cellulosic fibers, adding thereto from about 0.05% to about 1% by weight, based on the weight of the fibers, of an alkylketene dimer having the formula $[RCH=C=O]_2$ where R is a hydrocarbon radical selected from the group consisting of alkyl groups having at least 8 carbon atoms, cycloalkyl having at least 6 carbon atoms, aryl, aralkyl, and alkaryl groups, forming the cellulose fibers into sheets, treating the sheets so prepared with an alkaline laminating adhesive, and forming the resulting sheets into laminates.

2. The process of preparing laminated paperboard in accordance with claim 1 wherein the alkaline laminating adhesive is sodium silicate.

3. A laminated paperboard product having improved water resistance comprising a plurality of plies of paperboard adhesively secured together by an alkaline laminating adhesive, each of said plies of paperboard having incorporated therewith from about 0.05% to about 1% by weight, based on the weight of the paperboard, of an alkylketene dimer having the formula $[RCH=C=O]_2$ where R is a hydrocarbon radical selected from the group consisting of alkyl groups having at least 8 carbon atoms, cycloalkyl having at least 6 carbon atoms, aryl, aralkyl, and alkaryl groups.

4. A laminated paperboard product as set forth in claim 3 in which the alkaline laminating adhesive is sodium silicate.

References Cited in the file of this patent

UNITED STATES PATENTS

| | | |
|---|---|---|
| 1,462,835 | Stericker | July 24, 1923 |
| 1,656,647 | Regenstein | Jan. 17, 1928 |
| 2,434,466 | Marc | Jan. 13, 1948 |
| 2,601,114 | Gillespie | Jan. 8, 1949 |
| 2,627,477 | Downey | Feb. 3, 1953 |
| 2,669,282 | Kreyling | Feb. 16, 1954 |

UNITED STATES PATENT OFFICE
CERTIFICATE OF CORRECTION

Patent No. 2,959,512                    November 8, 1960

William H. Roberson

It is hereby certified that error appears in the printed specification of the above numbered patent requiring correction and that the said Letters Patent should read as corrected below.

Column 1, line 57, for "Altrenatively" read -- Alternatively --; column 2, line 13, for "100 sq. ft." read -- 1000 sq. ft. --

Signed and sealed this 25th day of April 1961.

(SEAL)
Attest:

ERNEST W. SWIDER
Attesting Officer

DAVID L. LADD
Commissioner of Patents